US007976668B2

(12) United States Patent
Kingma et al.

(10) Patent No.: US 7,976,668 B2
(45) Date of Patent: Jul. 12, 2011

(54) METHOD FOR PRODUCING WOOD-BASE MATERIALS

(75) Inventors: Arend Jouke Kingma, Ludwigshafen (DE); Franz Weingart, Weinheim (DE); Holger Militz, Goettingen (DE); Falko Wepner, Rosenheim (DE); Andreas Krause, Bovenden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 675 days.

(21) Appl. No.: 11/817,284

(22) PCT Filed: Mar. 3, 2006

(86) PCT No.: PCT/EP2006/001980

§ 371 (c)(1),
(2), (4) Date: Aug. 28, 2007

(87) PCT Pub. No.: WO2006/092331

PCT Pub. Date: Sep. 8, 2006

(65) Prior Publication Data

US 2008/0156435 A1 Jul. 3, 2008

(30) Foreign Application Priority Data

Mar. 4, 2005 (DE) ........................ 10 2005 010 041

(51) Int. Cl.

| | |
|---|---|
| ***C04B 37/00*** | (2006.01) |
| ***C09J 5/02*** | (2006.01) |
| ***B32B 27/00*** | (2006.01) |
| ***B32B 27/40*** | (2006.01) |

(52) U.S. Cl. .................. 156/325; 156/307.3; 428/425.1

(58) Field of Classification Search .............. 156/307.3, 156/325; 428/425.1

See application file for complete search history.

(56) References Cited

U.S. PATENT DOCUMENTS

| | | | | |
|---|---|---|---|---|
| 2,398,649 A | | 4/1946 | Kvalnes | |
| 2,452,200 A | | 10/1948 | Kvalnes | |
| 3,493,417 A | | 2/1970 | Moren | |
| 3,931,088 A | * | 1/1976 | Sakurada et al. ............ | 524/501 |
| 4,396,391 A | * | 8/1983 | North .............................. | 8/181 |

FOREIGN PATENT DOCUMENTS

| | | | |
|---|---|---|---|
| CA | 2501053 | * | 4/2004 |
| DE | 34 32 135 | | 3/1986 |
| DE | 199 25 865 | | 1/2001 |
| EP | 0 903 451 | | 3/1999 |
| GB | 600 961 | | 4/1948 |
| WO | 2004 033171 | | 4/2004 |

OTHER PUBLICATIONS

U.S. Appl. No. 12/088,702, filed Mar. 31, 2008, Kingma, et al.
U.S. Appl. No. 12/089,209, filed Apr. 4, 2008, Kingma, et al.
U.S. Appl. No. 11/817,511, filed Aug. 31, 2007, Baus, et al.

* cited by examiner

*Primary Examiner* — Philip C Tucker
*Assistant Examiner* — Michael N Orlando
(74) *Attorney, Agent, or Firm* — Oblon, Spivak, McClelland, Maier & Neustadt, L.L.P.

(57) ABSTRACT

The present invention relates to a process for the production of wood-base materials which have at least one thin veneer layer adhesively bonded over the surface to a substrate or to further veneer layers, which process comprises the following steps:

i. impregnation of a veneer with an aqueous curable composition which comprises
   a) at least one curable urea compound selected from urea compounds H which have at least one N-bonded group of the formula $CH_2OR$, where R is hydrogen or $C_1$-$C_4$-alkyl, and/or a 1,2-bishydroxyethane-1,2-diyl group bridging the two nitrogen atoms of the urea, precondensates of the urea compound H, and reaction products or mixtures of the urea compound H with at least one alcohol which is selected from $C_1$-$C_6$-alkanols, $C_2$-$C_6$-polyols and oligoethylene glycols, and
   b) at least one catalyst K effecting crosslinking of the urea compound;

ii) gluing of the impregnated veneer and/or the substrate with a glue composition and iii) processing of the glued veneer to give a wood-base material at elevated temperature with curing of the crosslinkable urea compound, the impregnated veneer comprising the crosslinkable urea compound in substantially uncrosslinked form before the gluing in step ii).

18 Claims, No Drawings

METHOD FOR PRODUCING WOOD-BASE MATERIALS

The present invention relates to a process for the production of wood-base materials which have at least one thin veneer layer adhesively bonded over the surface to a substrate or to further veneer layers.

Wood-base materials having wood veneer layers (veneered wood-base materials), including prefinished parquet, are distinguished not only by their esthetic properties but also by their more homogeneous properties in comparison with solid wood. On the other hand, their low dimensional stability in changing ambient humidities and their low biodegradability prove disadvantageous, so that these materials are as a rule not stable to weathering. Moreover, owing to the swelling and shrinkage of the wood under changing weathering conditions, the glue joint is subjected to considerable stress so that it loses its mechanical properties after some time, the veneer layers become detached from the substrate or, in the case of veneer composites, delamination of the composite occurs.

Although the danger of attack by wood-discoloring and/or wood-destroying microorganisms can be reduced by treating the wood with a biocide finish, this represents an additional cost factor and may be problematic for ecological reasons. The problems of the lack of mechanical stability and deformation under the action of moisture are, however, not solved by such a finish. The field of use of veneered wood-base materials has therefore been limited to date substantially to the interior sector.

In the case of prefinished parquet, there is also the problem that entry of moisture into the butt joints between the parquet lamellae, for example through wet cleaning or through spilled liquids, leads to swelling of the lamellae and hence to damage to the parquet.

In solving the problem, DE 19925865 proposes impregnating the end faces of parquet lamellae. Conventional finishes, varnishes, waxes, oils and the like are mentioned as impregnating agents. EP-A 903451 describes the sealing of the edges of prefinished parquet panels with a coating based on diphenylmethane diisocyanate. Permanent stability to the action of moisture cannot be achieved by these measures.

WO 2004/033171 describes the impregnation of wood lamellae for the top layer of prefinished parquet with a curable composition which comprises, as a curable component, a 1,3-bis(hydroxymethyl)-4,5-dihydroxyimidazolidin-2-one modified with methanol and ethylene glycol. The lamellae are cured after drying at temperatures of 130° C. and high pressure. Further processing of the wood lamellae is not described. The treatment leads to an improved surface hardness of the lamellae thus produced. The reduced resilience and flexibility of the lamellae thus produced is disadvantageous, which may lead to problems in the further processing and to damage to the lamellae. Moreover, the times required for the further processing increase, in particular the press time, in comparison with untreated veneers.

It is the object of the present invention to provide a process for the production of veneered wood-base materials, i.e. of wood-base materials which have at least one thin veneer layer adhesively bonded over the surface to a substrate, which process leads to wood-base materials having improved stability to weathering. In particular, the process should permit the production of veneered wood-base materials in a simple manner.

This and further objects are achieved by the process described below.

The invention therefore relates to a process for the production of a wood-base material which has at least one thin veneer layer adhesively bonded over the surface to a substrate or to further veneer layers, which process comprises the following steps:

i. impregnation of a veneer with an aqueous curable composition which comprises
   a) at least one curable urea compound selected from urea compounds H which have at least one N-bonded group of the formula $CH_2OR$, where R is hydrogen or $C_1$-$C_4$-alkyl, and/or a 1,2-bishydroxyethane-1,2-diyl group bridging the two nitrogen atoms of the urea, precondensates of the urea compound H, and reaction products or mixtures of the urea compound H with at least one alcohol which is selected from $C_1$-$C_6$-alkanols, $C_2$-$C_6$-polyols and oligoethylene glycols, and
   b) at least one catalyst K effecting crosslinking of the urea compound;

ii) gluing of the impregnated veneer and/or the substrate with a glue composition and iii) processing of the glued veneer to give a wood-base material at elevated temperature with curing of the crosslinkable urea compound, the impregnated veneer comprising the crosslinkable urea compound in substantially uncrosslinked form before the gluing in step ii).

The process according to the invention permits the production of veneered wood-base materials in a simple manner. Damage to the veneers does not occur in the process according to the invention or occurs only to a small extent. A further advantage is that the amount of glue composition for the production of a strong bond between the veneer and the substrate can be reduced. The process gives veneered wood-base materials having improved stability to weathering, in particular reduced shrinkage and swelling in changing ambient humidity. If the impregnated veneer layer forms at least one surface of the veneered wood-base material, these surfaces of the materials obtained moreover have an increased hardness (Brinel hardness). In addition, the veneered wood-base materials produced according to the invention have improved resistance to attack by wood-damaging organisms, without it being necessary to use conventional biocides.

The invention therefore also relates to the wood-base materials obtainable by the process described here.

The term "veneered wood-base material" used here comprises all wood-based materials which have at least one veneer layer. This veneer layer may be arranged on a substrate, which usually consists of a wood-base material, or may form a composite together with further veneer layers. The veneered wood-base materials to be produced according to the invention include, for example, veneered boards, for example veneered fiber boards, veneered block boards, veneered particle boards, including veneered OSL and PSL boards (oriented or parallel strand lumber), plywood, glued laminated board, laminated wood, veneered laminated wood (e.g. Kerto laminated wood), multiplex boards, laminated veneer lumber (LVL), decorative veneer lumbers, such as cladding, ceiling and prefinished parquet panels, but also nonplanar, 3-dimensionally shaped components, such as shaped laminated wood articles, shaped plywood articles and other arbitrary shaped articles laminated with at least one veneer layer. The process according to the invention is particularly suitable for the production of wood-base materials in which a plurality of modified veneer layers form a laminate, for example for the production of plywood, glued laminated board, laminated wood, veneered laminated wood and shaped articles produced therefrom. The process according to the invention is particularly suitable for the production of wood-base materials which have a veneer layer arranged on a substrate.

Veneers used may in principle be all conventional veneers comprising wood, such as sliced, rotary-cut or sawn veneers, including parquet lamellae. The thickness of the veneers is usually in the range from 20 μm to 10 mm, often from 100 μm to 10 mm, and in particular in the range from 0.6 mm to 6 mm. A first preferred embodiment of the invention relates to comparatively thin veneers having thicknesses in the range from 100 μm to 3 mm, in particular in the range from 0.5 mm to 3 mm and especially in the range from 0.6 to 2.5 mm. Another embodiment of the invention relates to comparatively thick veneers having thicknesses in the range from 3 mm to 10 mm, in particular in the range from 3 mm to 8 mm.

Suitable wood varieties for the veneers to be treated according to the invention are in principle all wood varieties usually used for veneer production, in particular those which can take up at least 30%, in particular at least 50%, of their dry weight of water and particularly preferably those which are classified in soakability classes 1 and 2 according to DIN EN 350-2. These include, for example, lumbers of conifers, such as pine (*Pinus* spp.), spruce, cedar, stone pine, Douglas fir, larch, pine, fir or grand fir, and lumbers of broad-leaved trees, e.g. maple, hard maple, acacia, ayons, birch, pear, beech, oak, alder, aspen, ash, serviceberry, hazel, hornbeam, cherry, chestnut, lime, American walnut, poplar, olive, locust, elm, walnut, rubber tree, zebrano, willow and Turkey oak, but also mixed veneers, e.g. fine-line veneers comprising poplar and ayons.

In a first step of the process according to the invention, the at least one wood veneer is impregnated with the aqueous, curable composition. The impregnation is effected as a rule in a manner such that the amount of crosslinkable urea compound taken up by the veneer is in the range from 1 to 100% by weight, frequently from 5 to 80% by weight, in particular from 10 to 70% by weight, based on the untreated veneer (calculated as kiln-dried veneer).

The moisture content of the veneer before the impregnation is not critical and may be up to 100%. For practical reasons, the veneer frequently has a moisture content of not more than 80%, or 50%, e.g. from 1 to 80%, or 5 to 80% or 5 to 50%. If appropriate, the veneer may have been rendered hydrophilic before the impregnation, for example by dielectric discharge in an oxygen-containing atmosphere analogously to the procedure described in DE-C 199 57 775.

Here and below, the terms "moisture content" and "moisture" used in association with the veneer are synonymous with the term residual moisture content according to DIN 52183.

The aqueous compositions of crosslinkable urea compounds which are used for the impregnation in step i) are known per se, for example from WO 2004/033171 cited at the outset, and from WO 2004/033170, K. Fisher et al. "Textile Auxiliaries—Finishing Agents", Section 7.2.2 in Ullmann's Encyclopedia of Industrial Chemistry, 5th Ed. on CD-ROM, Wiley-VCH, Weinheim 1997, and literature cited there, e.g. U.S. Pat. Nos. 2,731,364 and 2,930,715, and are usually used as crosslinking agents for textile finishing. The reaction products of urea compounds H with alcohols, e.g. modified 1,3-bis(hydroxy-methyl)-4,5-dihydroxyimidazolidin-2-one (mDMDHEU) are disclosed, for example, in U.S. Pat. No. 4,396,391 and WO 98/29393. Moreover, urea compounds H and their reaction products and precondensates are commercially available, for example under the trade names Fixapret® CP and Fixapret® ECO from BASF Aktiengesellschaft.

The urea compounds present in the aqueous compositions are low molecular weight compounds or oligomers having a low molecular weight, which are as a rule present completely dissolved in water. The molecular weight of the urea compounds is usually below 400 Dalton. It is assumed that, owing to these properties, the compounds can penetrate into the cell walls of the wood and, on curing, improve the mechanical stability of the cell wall and reduce their swelling caused by water.

Examples of crosslinkable urea compound of the curable, aqueous composition are, without being limited thereto:

- 1,3-bis(hydroxymethyl)-4,5-dihydroxyimidazolidin-2-one (DMDHEU),
- 1,3-bis(hydroxymethyl)-4,5-dihydroxyimidazolidin-2-one which is modified with a $C_1$-$C_6$-alkanol, a $C_2$-$C_6$-polyol or an oligoethylene glycol (modified DMDHEU or mDMDHEU),
- 1,3-bis(hydroxymethyl)urea,
- 1,3-bis(methoxymethyl)urea,
- 1-hydroxymethyl-3-methylurea,
- 1,3-bis(hydroxymethyl)imidazolidin-2-one (dimethylolethyleneurea),
- 1,3-bis(hydroxymethyl)-1,3-hexahydropyrimidin-2-one (dimethylolpropyleneurea),
- 1,3-bis(methoxymethyl)-4,5-dihydroxyimidazolidin-2-one (DMeDHEU) and
- tetra(hydroxymethyl)acetylenediurea.

The crosslinkable urea compounds include the compounds which have at least two N-bonded groups of the formula $CH_2OR$ and in particular those with R=H.

Particularly preferred are 3-bis(hydroxymethyl)-4,5-dihydroxyimidazolidin-2-one, 1,3-bis(hydroxymethyl)urea, 1,3-bis(hydroxymethyl)imidazolidin-2-one, tetra(hydroxymethyl)acetylenediurea and especially 1,3-bis(hydroxymethyl)-4,5-dihydroxyimidazolidin-2-one (DMDHEU).

In a very particularly preferred embodiment of the invention, the crosslinkable urea compound is selected from 1,3-bis(hydroxymethyl)-4,5-dihydroxyimidazolidin-2-one and a 1,3-bis(hydroxymethyl)-4,5-dihydroxyimidazolidin-2-one modified with a $C_1$-$C_6$-alkanol, a $C_2$-$C_6$-polyol or an oligoethylene glycol.

mDMDHEU are reaction products of 1,3-bis(hydroxymethyl)-4,5-dihydroxyimidazolidin-2-one with a $C_1$-$C_6$-alkanol, a $C_2$-$C_6$-polyol, an oligoethylene glycol or mixtures of these alcohols. Suitable $C_{1-6}$-alkanols are, for example, methanol, ethanol, n-propanol, isopropanol, n-butanol and n-pentanol, methanol being preferred. Suitable polyols are ethylene glycol, diethylene glycol, 1,2- and 1,3-propylene glycol, 1,2-, 1,3- and 1,4-butylene glycol and glycerol. Suitable oligoethylene glycols are in particular those of the formula $HO(CH_2CH_2O)_nH$, where n is from 2 to 20, among which diethylene glycol and triethylene glycol are preferred. For the preparation of mDMDHEU, DMDHEU are mixed with the alkanol, the polyol or the polyethylene glycol. Here, the monohydric alcohol, the polyol or the oligo- or polyethylene glycol is usually used in a ratio of from 0.1 to 2.0, in particular from 0.2 to 2, mole equivalents each, based on DMDHEU. The mixture of DMDHEU and the polyol or the polyethylene glycol is usually reacted in water at temperatures of, preferably, from 20 to 70° C. and a pH of, preferably, from 1 to 2.5, the pH generally being adjusted to a range of from 4 to 8 after the reaction.

In addition to the urea compounds H or their reaction products or precondensates thereof (component a)), curable aqueous compositions may also comprise one or more of the abovementioned alcohols, $C_1$-$C_6$-alkanols, $C_2$-$C_6$-polyols, oligoethylene glycols or mixtures of these alcohols (component c)). Suitable $C_{1-6}$-alkanols are, for example, methanol, ethanol, n-propanol, isopropanol, n-butanol and n-pentanol, methanol being preferred. Suitable polyols are ethylene glycol, diethylene glycol, 1,2- and 1,3-propylene glycol, 1,2-, 1,3- and 1,4-butylene glycol and glycerol. Suitable oligoethylene glycols are in particular those of the formula $HO(CH_2CH_2O)_nH$, where n is from 2 to 20, among which diethylene glycol and triethylene glycol are preferred.

The concentration of urea compound H or of the reaction product or precondensate thereof in the aqueous composition is usually in the range from 1 to 80% by weight, frequently in the range from 10 to 60% by weight and in particular in the range from 15 to 50% by weight, based on the total weight of the composition. If the curable, aqueous composition comprises one of the abovementioned alcohols, the concentration thereof is preferably in the range from 1 to 50% by weight, in particular in the range from 5 to 40% by weight. The total amount of component a) and component c) usually accounts for from 10 to 80% by weight, frequently from 10 to 60% by weight, and in particular from 20 to 50% by weight of the total weight of the aqueous composition.

In addition to the components a) and, if appropriate, c), the aqueous composition comprises a catalyst K (component b)), which effects crosslinking of the urea compound H or its reaction product or precondensate. As a rule, metal salts from the group consisting of the metal halides, metal sulfates, metal nitrates, metal phosphates, metal tetrafluoroborates; boron trifluoride; ammonium salts from the group consisting of the ammonium halides, ammonium sulfate, ammonium oxalate and diammonium phosphate; and organic carboxylic acids, organic sulfonic acids, boric acid, sulfuric acid, phosphoric acid and hydrochloric acid are suitable as catalyst K.

Examples of metal salts suitable as catalysts K are in particular magnesium chloride, magnesium sulfate, zinc chloride, lithium chloride, lithium bromide, aluminum chloride, aluminum sulfate, zinc nitrate and sodium tetrafluoroborate.

Examples of ammonium salts suitable as catalysts K are in particular ammonium chloride, ammonium sulfate, ammonium oxalate and diammonium phosphate.

Water-soluble organic carboxylic acids, such as maleic acid, formic acid, citric acid, tartaric acid and oxalic acid, and furthermore benzenesulfonic acids, such as p-toluenesulfonic acid, but also inorganic acids, such as hydrochloric acid, sulfuric acid, boric acid or mixtures thereof, are also particularly suitable as catalysts K.

The catalyst K is preferably selected from magnesium chloride, zinc chloride, magnesium sulfate, aluminum sulfate and mixtures thereof, magnesium chloride being particularly preferred.

The catalyst K is usually added to the aqueous composition only shortly before the impregnation of the lignocellulose material. It is usually used in an amount of from 1 to 20% by weight, in particular from 2 to 10% by weight, based on the total weight of the components a) and, if appropriate, c) present in the curable, aqueous composition. The concentration of the catalyst is usually in the range from 0.1 to 10% by weight and in particular in the range from 0.5 to 5% by weight, based on the total weight of the curable, aqueous composition.

Furthermore, the aqueous composition used for impregnating the wood veneer may comprise a part or the total amount of the binder components (glue components) of the liquid gluing composition which is used in step ii) for gluing the veneer and which is explained in more detail further below. In a preferred embodiment of the invention the composition used in step i) comprises at least 50%, in particular at least 80% and especially the total amount of the glue components present in the glue composition, based on the total amount of the glue components used in the process. The terms glue components and binder components are used here and below synonymously and refer to the nonvolatile components effecting the adhesive bonding of the veneer to the substrate, including the assistants and preservatives present, if appropriate, in the gluing composition. In this case, the concentration of binder in the aqueous composition is usually in the range from 0.5 to 25% by weight, frequently in the range from 1 to 20% by weight and in particular in the range from 5 to 15% by weight, based on the total weight of the aqueous composition. It is assumed that, in contrast to the crosslinkable urea compounds, the catalyst K and the alcohols of component c) which, if appropriate, are present, the binder components are not absorbed, or absorbed only to a small extent, by the cell walls of the wood but remain substantially on the surface of the wood veneer and are therefore available as gluing composition in the subsequent adhesive bonding process.

The impregnation can be effected in a conventional manner, for example by immersion, by application of reduced pressure, if appropriate in combination with pressure, or by conventional application methods, such as spreading, spraying and the like.

For immersion, the veneers, if appropriate after predrying, are immersed in a container which comprises the aqueous composition. The immersion is preferably effected over a period of from a few seconds to 24 h, in particular from 1 min to 6 h. The temperature is usually in the range from 15° C. to 50° C. Here, the veneer takes up the aqueous impregnating composition, it being possible to control the amount of curable components which is taken up by the veneer through the concentration of curable components (i.e. components a) and c)) in the aqueous composition, through the temperature and through the duration of treatment. The amount of curable components which is actually taken up can be determined and controlled by the person skilled in the art in a simple manner from the increase in weight of the veneer and the concentration of the aqueous composition. The veneers can be prepressed by means of press rolls, i.e. calendars, which are present in the aqueous impregnating composition. The reduced pressure occurring on relaxation in the wood then leads to an accelerated uptake of aqueous impregnating composition.

The impregnation can also be achieved by applying reduced pressure, it being possible, if appropriate, for a phase of elevated pressure to follow. For this purpose, veneer which as a rule has a moisture content in the range from 1% to 100%, is brought into contact with the aqueous composition, for example by immersion in the curable aqueous composition, under reduced pressure, which is frequently in the range from 10 to 500 mbar and in particular in the range from 40 to 100 mbar. The duration is usually in the range from 1 min 1 h. If appropriate, a phase under elevated pressure, for example in the range from 1 to 20 bar, in particular from 5 to 15 bar and especially from 10 to 12 bar, follows. The duration of this phase is usually in the range from 1 min to 12 hours. The temperatures are usually in the range from 15 to 50° C. Here, the veneer takes up the aqueous impregnating composition, it being possible for the amount of curable components which is taken up by the veneer to be controlled by the concentration of curable components in the aqueous composition, by the applied pressure, by the temperature and by the duration of treatment. Here too, the amount actually taken up can be calculated from the increase in weight of the veneer.

Furthermore, the impregnation can be effected by conventional methods for applying liquids to surfaces, for example by spraying or rolling or spreading. For this purpose, a veneer having a moisture content of not more than 50%, in particular not more than 30%, for example in the range from 12% to 30%, is used. The application is usually effected at temperatures in the range from 15 to 50° C. The amount of curable components which is taken up by the veneer can be controlled by the concentration of curable components in the aqueous composition, by the applied amount, by the temperature and by the duration of spraying. The amount of curable components which is actually taken up is obtained directly from the applied amount of aqueous composition. The spraying can be carried out in a conventional manner in all apparatuses suitable for spraying sheet-like bodies, for example by means of nozzle arrangements and the like. In the case of spreading or rolling, the desired amount of aqueous composition is applied to the veneer by means of rolls or brushes.

In a preferred embodiment of the impregnation, the veneer is first compressed, brought into contact with the aqueous curable composition and then relaxed. The compression can be carried out in a simple manner by means of pressing or in particular by means of pressure rollers, so-called calendars, which are present in the aqueous impregnating composition. However, the veneer can also be compressed in a chamber having a conventional sheet press, the chamber can then be flooded with the impregnating solution and the pressure can then be reduced in the flooded state. The pressure used during compression is typically in the range from 1 to 1000 N/cm$^2$, frequently in the range from 10 to 800 N/cm$^2$, in particular in the range from 50 to 500 N/cm$^2$. The vacuum occurring in the wood on relaxation then leads to accelerated absorption of aqueous impregnating composition.

The process according to the invention furthermore comprises a gluing step ii). Here, a liquid glue composition is applied to the veneer impregnated with the aqueous composition.

According to the invention, the curable components of aqueous impregnating composition are present in substantially uncrosslinked form during the gluing. As a rule, the gluing step ii) is therefore effected immediately after the impregnating step i) or simultaneously therewith. If appropriate, between the impregnation and gluing, it is possible to carry out the drying step under conditions under which curing of the components present in the aqueous composition does not take place or takes place only to a very small extent, for removing moisture. Preferably, a temperature of 100° C., in particular 80° C., is not exceeded during such a drying step. If drying is carried out, the veneer is preferably fixed in some way, for example in a press, in order to counteract deformation of the veneer.

Preferably, a moisture content of at least 5%, in particular at least 10%, based on the dry mass of the veneer, is not exceeded after the impregnation and before the gluing, in order to prevent premature curing of the aqueous components of the composition and in order to facilitate the further processing. The gluing step ii) is therefore preferably effected immediately after the impregnating step i) or particularly preferably simultaneously therewith. In the latter case, the impregnating solution will already comprise the main amount or in particular the total amount of the binder components of the gluing composition, and the gluing is effected in the manner effected for the impregnation.

If the gluing is carried out separately from the impregnation, the method used depends in a manner known per se on the veneer material to be produced. Processes for this purpose are familiar to the person skilled in the art, for example from H. H. Nimz material. Processes for this purpose are familiar to the person skilled in the art, for example from H. H. Nimz et al. "Wood—Wood-based Products", 2.2 Laminate Bonding, in particular 2.2.2.5 Production of Veneer Plywood in Ullmann's Encyclopedia of Industrial Chemistry, 5th Edition on CD-Rom, Wiley-VCH (cf. also F. Kollmann (Editor), Furniere, Lagerhölzer und Tischlerplatten, Springer-Verlag, Berlin 1962). Examples of gluing methods are the application of the liquid glue composition by means of rolls, for example by means of 2- or 4-roll arrangements, pouring on the liquid glue composition, for example by means of a gluing curtain, or application of the glue composition by melting.

If the veneer material to be produced according to the invention is a material which comprises a plurality of veneer layers glued to one another, not all veneer layers may be treated with glue. As a rule, veneer layers treated on both sides with glue are glued to veneer layers not treated with glue in the layer arrangement, the outer veneer layers as a rule not being treated with glue. If the veneer material to be produced according to the invention is a material which comprises a veneer layer glued to a substrate, both the veneer layer and the substrate surface to be adhesively bonded can be treated with glue.

In principle, all glue compositions customary for the production of veneer materials are suitable as glue compositions. Liquid glue compositions and in particular aqueous glue compositions are preferred. Suitable glue compositions are known to the person skilled in the art, for example from H. H. Nimz et al. "Wood—Wood-based Products", 2.2.2.4 Adhesives and Additives in Ullmann's Encyclopedia of Industrial Chemistry, 5th Edition on CD-Rom, Wiley-VCH, and A. Pizzi (Editor): *Wood Adhesives*, Marcel Dekker, New York 1983.

Examples of Gluing Compositions are i) Liquid, in particular aqueous formulations of heat-curable binders (reactive binders), such as aminoplast resins, phenol resins, isocyanate resins and epoxy resins; and ii) aqueous formulations of film-forming polymers, for example aqueous polymer dispersions based on styrene acrylates, polyacrylates (acrylic ester/methacrylic ester copolymers), vinyl acetate polymers (polyvinyl acetate), styrene-butadiene copolymers and the like.

Preferred gluing compositions are those based on the heat-curable binders mentioned in group i) and mixtures thereof with film-forming polymers of group ii). Preferred binders are aminoplast resins, phenol resins, isocyanate resins and polyvinyl acetate.

Particularly suitable aminoplast resins are formaldehyde condensates of urea (urea-formaldehyde condensates) and of melamine (melamine-formaldehyde condensates). They are commercially available as aqueous solutions or powders under the names Kaurit® and Kauramin® (manufacturer BASF) and comprise urea- and/or melamine-formaldehyde precondensates. Typical phenol resins are phenol-formaldehyde condensates, phenol-resorcinol-formaldehyde condensates and the like. Cocondensates of aminoplast resins and phenol resins are also suitable. Examples of cocondensates of aminoplast resins and phenol resins are urea-melamine-formaldehyde condensates, melamine-urea-formaldehyde-phenol condensates and their mixtures. Their preparation and use for the production of moldings of finely divided lignocellulose materials are generally known. Urea-formaldehyde resins are preferred and among these in particular are those having a molar ratio of 1 mol of urea to 1.1 to 1.4 mol of formaldehyde.

During the processing of aminoplast resins and phenol resins, a transformation of the soluble and fusible precondensates to nonfusible and insoluble products takes place. In this process referred to as curing, complete crosslinking of the precondensates, which as a rule is accelerated by curing agents, is known to take place. Curing agents which may be used are the curing agents known to the person skilled in the art for urea-, phenol- and/or melamine-formaldehyde resins, such as acidic and/or acid-eliminating compounds, e.g. ammonium or amine salts. As a rule, the proportion of curing agent in a laminating resin liquor is from 1 to 5% by weight, based on the proportion of liquid resin.

Suitable isocyanate resins are all customary resins based on methylenediphenyl isocyanates (MDI). They consist as a rule of a mixture of monomers and oligomeric di- or polyisocyanates, i.e. precondensates, which are capable of reacting with the cellulose, the lignin and the moisture of the lignocellulose particles. Suitable isocyanate resins are commercially available, for example, as Lupranat® grades (from Elastogran).

Suitable binders of group ii) are in principle all water-insoluble polymers which are film-forming and are dispersible in water. These include in particular emulsion polymers and the powders prepared therefrom, such as those designated as polymers A1, for example, in WO 01/27198. The polymers frequently have a glass transition temperature in the range from −20 to +150° C. and in particular in the range from 0 to +100° C. They are in particular polyvinyl acetates, copolymers based on styrene/butadiene, those based on styrene/alkyl acrylate and those based on alkyl methacrylate/alkyl acrylate and those based on alkyl methacrylate/alkyl acrylate.

The amount of gluing composition applied depends in a manner known per se on the veneer to be glued and on the type of veneer material to be produced and is typically in the range from 50 to 500 g/m$^2$, in particular from 60 to 300 g/m$^2$, per glued veneer or from 1 to 30% by weight, in particular from 5 to 25% by weight, based on the veneer material and calculated as dry glue (i.e. minus any solvent and diluent).

The processing of the glued veneer to give a wood-base material is effected in a manner known per se, for example by adhesive bonding of the glued veneer over the surface to a substrate (or of the veneer to the glued substrate), preferably a substrate comprising wood or a wood-base material, or by adhesive bonding of two veneer layers to so-called slabs or of several, as a rule 3 to 11, e.g. 3, 5, 7, 9 or 11, veneer layers to a wood-base material or by combined adhesive bonding to a substrate and further veneer layers.

If the veneer material to be produced according to the invention is one in which the veneer is adhesively bonded over the surface to a substrate, the substrate is preferably wood or a wood-base material, for example layers of sawn wood strips optionally adhesively bonded to one another, plywood, particle boards, including OSB, LSL and PSL, fiberboards, e.g. soft fiberboards, MDF or HDF, sandwich type plasterboard, cardboard and the like. If they comprise wood, the substrates may or may not be impregnated with the curable aqueous compositions used for impregnating the veneer layer and cured. The production of such impregnated wood substrate materials can be effected according to the processes described in WO 2004/033170 and WO 2004/033171. Wood fiberboards and wood particle boards used as substrate can moreover be produced from wood fiberboard materials and wood particle board materials, respectively, which have been impregnated with one (or more) of the curable aqueous compositions used for impregnating the veneer and cured. A parallel patent application relates to a process for the production of such boards.

If the veneer material to be produced according to the invention is a material which comprises a plurality of veneer layers glued to one another, according to the invention at least one veneer layer, preferably a plurality of veneer layers and in particular all veneer layers is or are provided with an impregnation according to the invention.

The further processing is typically effected at elevated temperature in order firstly to achieve effective adhesive bonding of the glued veneer and secondly to achieve curing of the curable components of the aqueous impregnating composition which have been absorbed by the wood. The temperatures used are typically above 100° C. and below the decomposition temperature of the wood and of the glue components, preferably in the range from 110° C. to 200° C. and in particular in the range from 120° C. to 180° C. Advantageously, the further processing is effected by applying elevated pressure of as a rule at least 0.1 MPa, for example from 0.1 to 10 MPa, preferably at least 0.2 MPa, e.g. from 0.2 to 8 MPa and in particular at least 0.3 MPa, for example in the range from 0.3 MPa to 5 MPa, in particular in the range from 0.3 to 2 MPa or from 0.5 to 1.6 MPa, in order to achieve uniform adhesive bonding of the glued veneer to the substrate or to the further veneer layers. The times required for adhesive bonding depend on the type of material to be produced and are typically in the range from 1 min to 60 min per mm veneer thickness, frequently in the range from 2 min to 30 min per cm veneer material thickness and in particular in the range from 5 to 15 min per cm veneer material thickness.

The process according to the invention is suitable in principle for the production of all known veneer materials. Examples of suitable veneer materials are the abovementioned ones.

In a preferred embodiment, veneer materials are those in which at least one surface, in particular a decorative surface or the surfaces exposed to weathering, is formed by a veneer layer treated according to the invention. Examples of these are decorative boards for wall and ceiling claddings, veneered particle boards, fiberboards and plywood boards for the furniture industry and in particular prefinished parquet.

Prefinished parquet is understood by the person skilled in the art as meaning wood panels having a decorative top or footfall layer of wood veneer lamellae and at least one substrate or base layer, which usually consists of a wood material, for example a layer of sawn wood strips optionally adhesively bonded to one another, plywood, particle board, including OSB, fiberboard, e.g. soft fiberboard, MDF or HDF, and the like. In addition, the prefinished parquet panels may also comprise intermediate layers which likewise typically consist of wood or wood-base materials, and layers which provide footfall insulation, as described in EP1364774. In addition, such panels may also have constructional devices which facilitate laying of the panels, for example tongue-and-groove or catches. Advantageously, in the prefinished parquet panels according to the invention, in particular the wood lamellae or veneers of the top layer, i.e. the useful layer of the parquet, have an impregnation according to the invention. Developments of prefinished parquet panels are described, for example, in the article by A. Truscek and Z. Budrovic, "Manufacturing, characteristics and use of pre-finished engineered parquet" in Wood in . . . teristics and use of pre-finished engineered parquet" in Wood in construction industry: prospectives of reconstruction, International conference proceedings.

In a further preferred embodiment, the wood-base material is a wood-base material consisting of two or more veneer layers adhesively bonded to one another, preferably a wood-base material consisting of an uneven number of veneer layers, e.g. 3, 5, 7, 9 or 11 thereof, adhesively bonded to one another, for example a laminated wood or plywood, as explained above. In these wood-base materials, the individual veneer layers may be identical or different, i.e. may consist of different lumbers and/or have different thicknesses, and/or comprise different amounts of crosslinked urea compound H. The production is effected as a rule by arranging veneer layers alternately treated on both sides with glue and not treated with glue in a stratified manner and adhesively bonding them to one another under the above-mentioned conditions, the outer veneer layers, i.e. those which form the surface of the veneer material, not being treated with glue.

The following examples serve for further explanation of the invention.

EXAMPLE 1

Production of a Prefinished Parquet Floor

A 50% strength by weight aqueous solution of a mDMDHEU modified with diethylene glycol and methanol was mixed with 1.5% by weight of $MgCl_2.6H_2O$. Saw-rough beech wood lamellae dried to a wood moisture content of about 12% and having dimensions 500 mm×100 mm×4 mm were introduced into an impregnating unit. The impregnating unit was subjected to reduced pressure of 100 mbar absolute for 30 minutes and then flooded with the impregnating agent. A pressure of 10 bar was then applied for one hour. The pressure phase was terminated and the residual liquid was removed.

The impregnated lamellae of the top layer were fixed in a stack so that distortion was made impossible. The lamellae were dried for about 4 days at a temperature of 50° C. The residual moisture content was then 20%.

The lamellae produced in this manner were then glued on one side with an aqueous melamine resin formulation in an amount of 200 g/m$^2$, based on the nonaqueous proportion of the formulation.

The wood lamella was then glued to a fiberboard to give a prefinished parquet floor. This was effected by introducing the lamella and the fiberboard into a heatable press. The press was heated to 140° C. and the lamellae were pressed with 0.9 N/mm$^2$ for about 30 min.

After cooling, the prefinished parquet floor was removed from the press.

EXAMPLE 2

Production of a Multiplex Board

A 50% strength by weight aqueous solution of an mDMDHEU modified with diethylene glycol and methanol was mixed with 1.5% by weight of $MgCl_2.6H_2O$. Saw-rough birch wood veneers dried to a wood moisture content of about 12% and having dimensions 300 mm×300 mm×1.5 mm were introduced into an impregnating unit. The impregnating unit was subjected to a reduced pressure of 100 mbar absolute for 30 minutes and then flooded with the impregnating agent. A pressure of 10 bar was then applied for one hour. The pressure phase was terminated and the residual liquid was removed.

The impregnated veneers were glued on both sides with an aqueous melamine resin formulation in an amount of 200 g/m$^2$, based on the nonaqueous proportion of the formulation.

5 veneers in each case were then glued to give a multiplex board. For this purpose, the veneers were introduced into a heatable press. The press was heated to 140° C. and the veneers were pressed with 0.8 N/mm$^2$ for about 15 min.

After cooling, the board was removed from the press.

We claim:

1. A process for the production of a wood-base material which has at least one thin veneer layer adhesively bonded over the surface to a substrate or to further veneer layers, comprising:

i) impregnating at least one veneer with an aqueous curable composition which comprises a) at least one crosslinkable urea compound selected from urea compounds H which have at least one N-bonded group of the formula $CH_2OR$, where R is hydrogen or $C_1$-$C_4$-alkyl, and/or a 1,2-bishydroxyethane-1,2-diyl group bridging the two nitrogen atoms of the urea, precondensates of the urea compound H, and reaction products or mixtures of the urea compound H with at least one alcohol which is selected from $C_1$-$C_6$-alkanols, $C_2$-$C_6$-polyols and oligoethylene glycols, and b) at least one catalyst K effecting crosslinking of the urea compound;

ii) applying a glue composition to the impregnated veneer and/or the substrate and iii) processing the veneer to give a wood-base material, wherein the glued veneer is adhesively bonded over the surface to the substrate or wherein the veneer is bonded over the surface to the glued substrate or wherein two or several veneers are bonded together or wherein the substrate and the further veneer are bonded together, at elevated temperature with curing of the crosslinkable urea compound, the impregnated veneer comprising the crosslinkable urea compound in substantially uncrosslinked form during the applying in ii).

2. The process according to claim 1, wherein the aqueous composition used in i) is in an amount such that the amount of crosslinkable urea compound taken up by the veneer is in the range from 1 to 100% by weight, based on the untreated veneer.

3. The process according to claim 1, wherein the veneer has a thickness of from 20 μm to 10 mm.

4. The process according to claim 1, wherein the impregnated veneer has a moisture content of at least 5%, based on the dry mass of the veneer, before the applying in ii).

5. The process according to claim 4, wherein the composition used in i) comprises at least 50%, based on the total amount of the glue components used in the process, of the glue components which the glue composition comprises.

6. The process according to claim 5, wherein the applying and impregnating are effected together.

7. The process according to claim 1, wherein the processing in iii) is effected at temperatures in the range from 100 to 200° C.

8. The process according to claim 1, wherein the glue composition used in ii) comprises a heat-curable binder.

9. The process according to claim 8, wherein the glue composition used is in the form of an aqueous formulation of the heat-curable binder.

10. The process according to claim 1, wherein the impregnated veneer forms at least one surface of the wood-base material.

11. The process according to claim 10, wherein the wood-base material is a prefinished parquet.

12. The process according to claim 10, wherein the wood-base material is a laminated wood or plywood.

13. The process according to claim 1, wherein the crosslinkable urea compound is selected from the group consisting of 1,3-bis(hydroxymethyl)-4,5-dihydroxyimidazolidin-2-one,
bis(hydroxymethyl)-4,5-dihydroxyimidazolidinone which is modified with a $C_1$-$C_6$-alkanol, a $C_2$-$C_6$-polyol or an oligo—or a polyethylene glycol,
1,3-bis(hydroxymethyl)urea,
1,3-bis(methoxymethyl)urea,
1-hydroxymethyl-3-methylurea,
1,3-bis(hydroxymethyl)imidazolidin-2-one,
1,3-bis(hydroxymethyl)-1,3-hexahydropyrimidin-2-one,
1,3-bis(methoxymethyl)-4,5-dihydroxyimidazolidin-2-one,
tetra(hydroxymethyl)acetylenediurea, and
combinations thereof.

14. The process according to claim 1, wherein the concentration of crosslinkable urea compound in the aqueous curable composition is in the range from 1 to 60% by weight, based on the total weight of the composition.

15. The process according to claim 1, wherein the catalyst K is selected from metal salts from the group consisting of the metal halides, metal sulfates, metal nitrates, metal phosphates, metal tetrafluoroborates; boron trifluoride; ammonium salts from the group consisting of the ammonium halides, ammonium sulfate, ammonium oxalate and diammonium phosphate; organic carboxylic acids, organic sulfonic acids, boric acid, sulfuric acid and hydrochloric acid.

16. The process of claim 1, wherein the glue composition is in the form of an aqueous formulation of film-forming polymers.

17. The process of claim 16, wherein the glue composition comprises a heat-curable binder selected from the group consisting of aminoplast resins, phenol resins, isocyanate resins, epoxy resins, and combinations thereof.

18. The process of claim 17, wherein the glue composition comprises a film forming polymer dispersion selected from the group consisting of a styrene acrylate dispersion, a polyacrylate dispersion, a vinyl acetate polymer dispersion, a styrene-butadiene copolymer dispersion, and combinations thereof.

* * * * *